United States Patent
Kapp

(10) Patent No.: US 11,460,107 B2
(45) Date of Patent: Oct. 4, 2022

(54) SELECTOR DRUM AND MOTOR-VEHICLE MANUAL TRANSMISSION

(71) Applicant: Magna PT B.V. & Co. KG, Untergruppenbach (DE)

(72) Inventor: Stefan Kapp, Walheim (DE)

(73) Assignee: MAGNA PT B.V. & CO. KG, Untergruppenbach (DE)

( * ) Notice: Subject to any disclaimer, the term of this patent is extended or adjusted under 35 U.S.C. 154(b) by 382 days.

(21) Appl. No.: 16/631,044

(22) PCT Filed: Jul. 4, 2018

(86) PCT No.: PCT/EP2018/068160
§ 371 (c)(1),
(2) Date: Jan. 14, 2020

(87) PCT Pub. No.: WO2019/020334
PCT Pub. Date: Jan. 31, 2019

(65) Prior Publication Data
US 2020/0149633 A1    May 14, 2020

(30) Foreign Application Priority Data
Jul. 28, 2017   (DE) .......................... 102017117171.1

(51) Int. Cl.
*F16H 63/16* (2006.01)
*F16H 61/688* (2006.01)
*F16H 63/02* (2006.01)

(52) U.S. Cl.
CPC ........... *F16H 63/16* (2013.01); *F16H 61/688* (2013.01); *F16H 2063/025* (2013.01); *F16H 2306/00* (2013.01)

(58) Field of Classification Search
CPC .. F16H 63/16; F16H 61/688; F16H 2063/025; F16H 2306/00; F16H 63/18; F16H 2306/14
See application file for complete search history.

(56) References Cited

U.S. PATENT DOCUMENTS

2008/0078605 A1* 4/2008 Sotani ..................... F16H 63/18
180/337
2011/0100144 A1* 5/2011 Neelakantan ........... F16H 63/18
74/473.36

FOREIGN PATENT DOCUMENTS

| CN | 1918408 A | 2/2007 |
|---|---|---|
| CN | 101061336 A | 10/2007 |

(Continued)

OTHER PUBLICATIONS

International Search Report and Written Opinion dated Sep. 26, 2018 from International Patent Application No. PCT/EP2018/068160 (with English Translation of International Search Report).

*Primary Examiner* — Justin Holmes
(74) *Attorney, Agent, or Firm* — Dickinson Wright PLLC

(57) ABSTRACT

A selector drum for an automated manual transmission, in particular a dual clutch transmission, having a selector drum body, which can be mounted in the manual transmission for rotation about an axis of rotation, wherein at least one shifting contour is formed on the selector drum body, said shifting contour extending over a peripheral portion of the selector drum body, wherein the selector drum is designed for shifting at least one high gear stage, one middle gear stage and one low gear stage, wherein the at least one shifting contour has a shifting contour switch in a region of a switch gear portion.

20 Claims, 6 Drawing Sheets

(56) References Cited

FOREIGN PATENT DOCUMENTS

| | | | |
|---|---|---|---|
| CN | 102052455 A | 5/2011 | |
| DE | 708872 C | 7/1941 | |
| DE | 19924335 A1 | 12/2000 | |
| DE | 10203633 A1 | 9/2003 | |
| DE | 10361356 A1 | 7/2005 | |
| DE | 102004058475 A1 | 5/2006 | |
| DE | 102010049860 A1 | 6/2011 | |
| DE | 102012020426 A1 | 4/2014 | |
| DE | 202013007987 U1 * | 1/2015 | ............ F16H 3/006 |
| DE | 102016124403 A1 | 6/2018 | |
| EP | 111803 A2 | 7/2001 | |
| JP | 2016186357 A * | 10/2016 | ............ F16H 3/006 |

\* cited by examiner

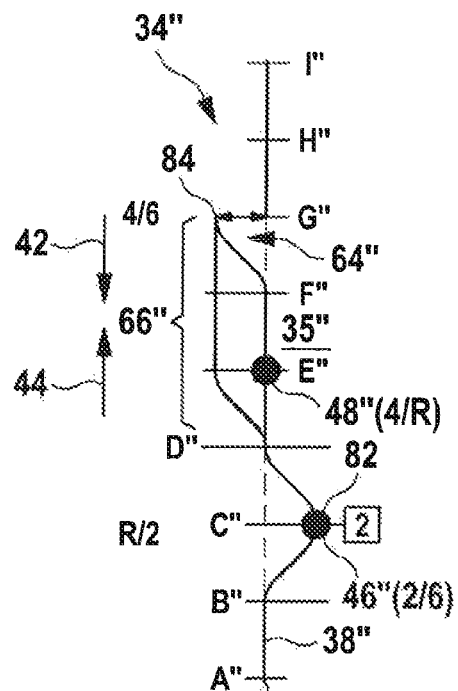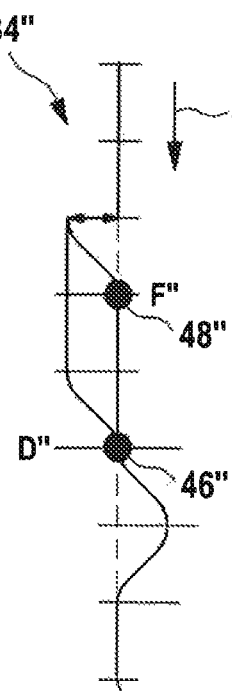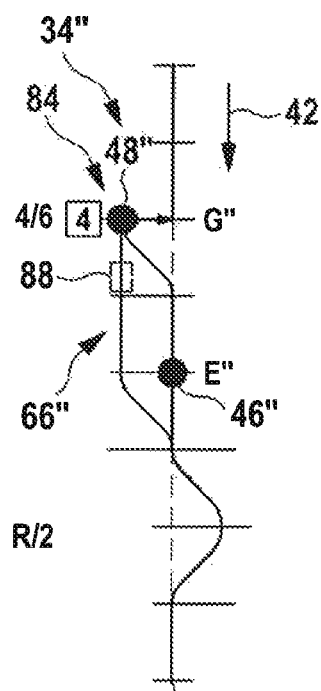
Fig. 12  Fig. 13  Fig. 14
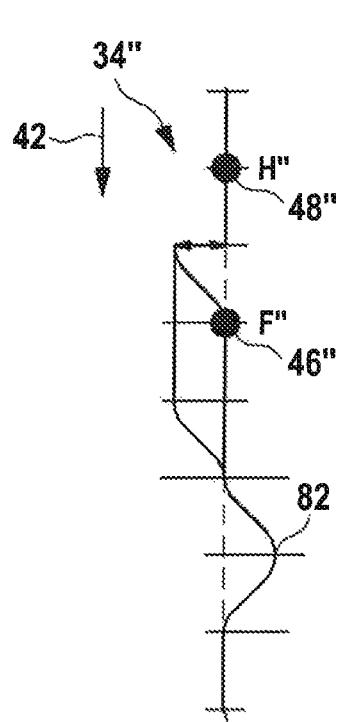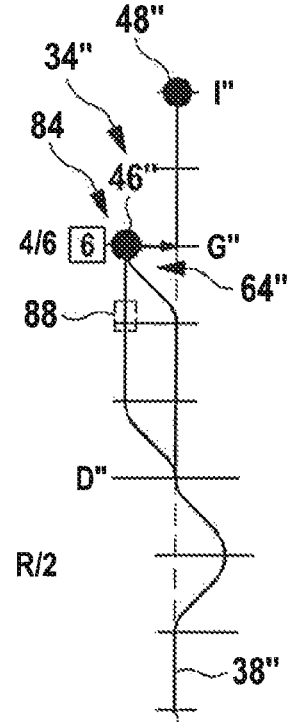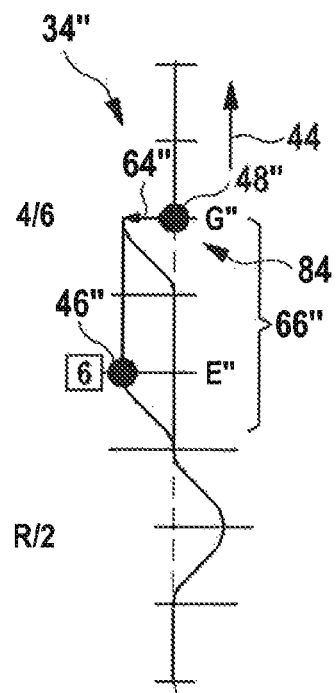
Fig. 15  Fig. 16  Fig. 17

SELECTOR DRUM AND MOTOR-VEHICLE MANUAL TRANSMISSION

CROSS-REFERENCE TO RELATED APPLICATIONS

This application is a National Stage of International Application No. PCT/EP2018/068160, filed Jul. 4, 2018, which claims priority to DE 102017117171.1 filed Jul. 28, 2017. The entire disclosures of each of the above applications are incorporated herein by reference.

FIELD OF THE INVENTION

The present invention relates to a selector drum for an automated manual transmission, in particular a dual clutch transmission, having a selector drum body, which can be mounted in the manual transmission for rotation about an axis of rotation, wherein at least one shifting contour is formed on the selector drum body, said shifting contour extending over a peripheral portion of the selector drum body, wherein the selector drum is designed for shifting at least one high gear stage, one middle gear stage and one low gear stage, wherein the at least one shifting contour has a shifting contour switch in a region of a switch gear portion.

The present invention furthermore relates to a manual transmission for a motor vehicle, having an input shaft arrangement, an output shaft arrangement and a plurality of gearsets, which can be shifted by means of a shift arrangement, wherein the shift arrangement has a selector drum of the abovementioned type.

Document DE 103 61 356 B4 discloses a selector drum on which a circumferential groove has flanks, wherein a flank portion which is mounted in an axially movable manner is designed to disengage an engaged gear under a preload.

Document DE 10 2012 020 426 A1 discloses a selector drum for a shift arrangement of a dual clutch transmission, wherein the selector drum is embodied in such a way that sequential upshifts and downshifts as well as multiple downshifts can be implemented, wherein the selector drum has a first selector drum part that is axially immovable but rotatable and a second selector drum part, which is mounted in an axially movable manner on the first selector drum part. A plurality of selector slots is formed on the first selector drum part. A selector slot and two control slots that can be activated as alternatives are formed on the second selector drum part, by means of which slots the selector slot of the second selector drum part is configured either for sequential shifts or for a multiple downshift free from interruptions in the tractive effort. For multiple downshifts, the selector slot of the second selector drum part is assigned to the low target gear stage.

Furthermore, document DE 10 2004 058 475 B4 discloses an actuator arrangement for a dual clutch transmission having two selector drums, wherein at least one of the selector drums has two control cams, of which one is assigned to a first component transmission of the dual clutch transmission and of which the other is assigned to a second component transmission of the dual clutch transmission. Here, it is also envisaged that a circumferential gear portion of a reverse gear is accessible to a cam follower only in one direction of rotation, via a passive switch of the associated control cam.

In the earlier patent application with the file reference DE 10 2016 124 403.1, a selector drum having an integrated active shifting contour switch is disclosed, which is used in multiple downshifts.

In the case of dual clutch transmissions which have shift arrangements comprising one or more selector drums, multiple downshifts and upshifts always require other gear stages to be traversed or synchronized owing to the generally sequential arrangement of the gear stages on the selector drums. In general, this leads to long shifting times or long slip times of the dual clutch arrangement.

As mentioned, the practice of providing selector drums with passive switches is known. Passive switches are relatively simple to implement.

Active switches, in contrast, are of relatively complex construction, leading to high costs.

Given this background, it is an object of the invention to specify an improved selector drum for a motor-vehicle manual transmission and an improved manual transmission for motor vehicles.

SUMMARY OF THE INVENTION

This section provides a general summary of the disclosure, and is not a comprehensive disclosure of its full scope or all of its features.

The above object is achieved by a selector drum for an automated manual transmission, in particular a dual clutch transmission, having a selector drum body, which can be mounted in the manual transmission for rotation about an axis of rotation, wherein at least one shifting contour is formed on the selector drum body, said shifting contour extending over a peripheral portion of the selector drum body, wherein the selector drum is designed for shifting at least one high gear stage, one middle gear stage and one low gear stage, wherein the at least one shifting contour has a shifting contour switch in a region of a switch gear portion, wherein the switch gear portion is assigned to the middle gear stage, wherein the switch gear portion is designed, by means of the shifting contour switch, in such a way that the middle gear stage is shifted in a first direction of rotation of the selector drum body and is not shifted in a second direction of rotation and the at least one shifting contour is also designed in such a way that, in the second direction of rotation of the selector drum body, the high gear stage can remain shifted if a driver assigned to the middle gear stage is in a region of the switch gear portion, such that, proceeding from the high gear stage, the low gear stage can be shifted without shifting the middle gear stage.

The object is furthermore achieved by a manual transmission for a motor vehicle, having an input shaft arrangement, an output shaft arrangement and a plurality of gearsets, which can be shifted by means of a shift arrangement, wherein the shift arrangement has a selector drum according to the invention.

The present invention allows multiple downshifts from a high gear stage to a low gear stage without having to shift the middle gear stage or to synchronize the selector clutch thereof in the meantime. Accordingly, it is possible to achieve very short times for multiple downshifts of this kind.

This is also achieved by virtue of the fact that the design of the shifting contour enables the high gear stage to remain shifted when the driver of the middle gear stage is in the region of the switch gear portion but the middle gear stage is not engaged.

In other words, it is possible to ensure that, during the multiple downshift, the high gear stage can remain engaged for as long as is possible in terms of transmission engineering and is disengaged only when the low gear stage is to be engaged.

It is thereby possible to transmit tractive effort to the output without clutch slip for a longer period of time (in the high gear stage) until the high gear stage is then immediately disengaged and the low gear stage is engaged.

The combination of a switch gear portion and a shifting contour, which allows such an "extension" of the engagement of the high gear stage, can lead to particularly short shifting times for multiple downshifts.

In the present context, the term "multiple downshift" is intended to include shifts from a high gear stage to a low gear stage, wherein there is at least one middle gear stage between the high gear stage and the low gear stage. The present invention can preferably be applied to multiple downshifts in which there are two, in particular three, middle gear stages between the high gear stage and the low gear stage.

The shifting contours are preferably designed as shifting grooves, in which a driver engages. A driver is preferably assigned in each case to a selector clutch pack of the manual transmission. The manual transmission is preferably a spur gear transmission, in which free gears can be connected to shafts in order to shift gearsets into the gear flow. The selector clutch packs used during this process often have an individual gear shift sleeve, which is coupled to the driver. The two selector clutches of a selector clutch pack can preferably be shifted in alternation, thus enabling the two gear stages of a selector clutch pack to be shifted into the power flow as alternatives.

Insofar as there is mention in the present case of the fact that a driver engages in a shifting contour, this phrase should be interpreted broadly. This can be engagement of a block or rod in a groove but can also involve fitting over a web-shaped shifting contour, wherein the driver is of fork-type design, for example, or the like.

In the present case, the concept of shifting should likewise be interpreted broadly. In general, the shifting of a gear stage means either engagement or disengagement of this gear stage, i.e. the shifting of this gear stage into the power flow or the withdrawal of this gear stage from the power flow. In some embodiments, shifting of a gear stage is understood exclusively as engagement of this gear stage.

The shifting contour switch of the switch gear portion is preferably designed in such a way that a driver which is assigned to the middle gear stage is deflected into a gear position by a switch body in the first direction of rotation of the selector drum body, with the result that the middle gear stage is shifted. In the opposite, second direction of rotation, it is preferably envisaged that the driver of the middle gear stage deflects the switch body or is allowed through by the latter, and therefore the driver itself is not deflected and does not move into a gear position of the gear portion. Consequently, the middle gear stage is not shifted in this second direction of rotation.

Overall, it is possible to ensure that the high gear stage remains shifted and can transmit tractive effort until ultimately the high gear stage is positively disengaged and the low gear stage is then engaged immediately thereafter in order then to be able to transmit tractive effort via the low gear stage.

In automated manual transmissions having a single input-side friction clutch, a process of this kind then takes place with interruption of the tractive effort.

In the case of dual clutch transmissions, it is conceivable in general to transmit tractive effort via the other component transmission for a period between the disengagement of the high gear stage and the engagement of the low gear stage.

The object is fully achieved.

The selector clutch switch of the switch gear portion can be designed as an active switch, such that a switch body is deflected by means of a mechanism into one of at least two different axial positions on the selector drum body, depending on the direction of rotation.

However, it is particularly advantageous if the shifting contour switch of the switch gear portion is designed as a passive switch.

In this embodiment, a switch body of the shifting contour switch is preferably preloaded by means of a spring into an initial position, in which the driver of the middle gear stage is deflected into the gear position by the switch body in the first direction of rotation. In the second direction of rotation, the driver of the middle gear stage then preferably presses the switch body away in the axial direction against the preload of the spring, with the result that the driver of the middle gear stage does not enter the gear position which corresponds to the middle gear stage when traversing the switch gear portion in the second direction of rotation. Consequently, the middle gear stage is then not engaged or shifted.

According to another embodiment, which is preferred overall, the at least one shifting contour has an axially widened portion, which is preferably adjacent in the circumferential direction to the switch gear portion.

The axially widened portion makes it possible to have the high gear stage shifted when the selector drum body is moved in the second direction of rotation and when a driver which is assigned to the middle gear stage is in a region of the switch gear portion.

The axial width of the widened portion is at least 1.5 times the axial width of the driver or of the remainder of the shifting contour. The axial width of the axially widened portion is preferably situated in a region of 1.8 to 2.2 times the width of the driver or the remainder of the shifting contour.

Overall, it is furthermore advantageous if the selector drum has a first shifting contour ($32a$), in which a first driver for the middle gear stage engages, and a second shifting contour, in which a second driver for the high gear stage engages.

The two shifting contours are preferably formed on the selector drum body in axially offset positions and each extend over an associated circumferential segment. The circumferential segments can be of equal length but can also be of different lengths.

In this case, the first driver is assigned to a selector clutch pack which is designed at least for shifting the middle gear stage. In this case, the second driver is assigned to a selector clutch pack which is designed at least for shifting the high gear stage.

It is particularly preferred if the first driver, which engages in the first shifting contour, is assigned to a selector clutch pack which includes a selector clutch for the middle gear stage and a selector clutch for the low gear stage.

Provision is preferably made here for the first shifting contour to include the switch gear portion and a gear portion for the low gear stage. The second shifting contour preferably has a gear portion for the high gear stage and preferably includes an axially widened portion, which enables the high gear stage to be engaged when a driver of the middle gear stage is in a region of the switch gear portion.

According to another preferred embodiment, the second driver, which engages in the second shifting contour, is assigned to a selector clutch pack which includes a selector clutch for the high gear stage and preferably a shifting contour for a further gear stage, which is preferably a gear stage that is even lower than the low gear stage.

In an illustrative embodiment, the high gear stage here is gear stage 7, the middle gear stage is gear stage 5, and the low gear stage is gear stage 3. Here, the selector clutch pack which is assigned to the high gear stage 7 can furthermore include a selector clutch for a gear stage 1 (starting gear stage).

It is furthermore advantageous overall if the switch gear portion and an output gear portion assigned to the high gear stage overlap in the circumferential direction.

In the case of two shifting contours on a selector drum, the terms "overlap" and "adjacent in the circumferential direction" should be understood in a logical way here. The present description is directed generally to the assumption that the two drivers are situated in the same circumferential position. However, it is self-evident that the two drivers can also engage in different positions on the selector drum in the circumferential direction, with the result that the two shifting contours are then correspondingly offset relative to one another by this angular amount in the circumferential direction. In this case, there is, for example, no actual "overlap" between certain circumferential segments of the shifting contours, this overlap being present only from a logical perspective, with the assumption that the two drivers are situated in the same circumferential position.

According to another preferred embodiment, a target gear portion for the low gear stage is adjacent in the circumferential direction to the switch gear portion.

Consequently, the low gear stage can then be engaged directly after the switch gear portion has been traversed, without shifting the middle gear stage and simultaneously holding the engagement of the high gear stage.

In general, selector drums for motor-vehicle transmissions can be constructed in such a way that they include an individual shifting contour for each driver.

In an alternative embodiment, two drivers engage in an individual shifting contour, more specifically at different circumferential positions.

This has the advantage that certain gear portions can be used both by one driver and the other driver.

The selector drum can be implemented in a more compact way in the axial direction.

In this further alternative, it is accordingly advantageous if the at least one shifting contour has an individual shifting contour, in which a first driver and a second driver engage, wherein the first driver is assigned to the high gear stage and wherein the second driver is assigned to the middle gear stage.

In this case, the first and the second driver are arranged offset in the circumferential direction by the spacing of gear stages.

It is particularly advantageous here if the first driver is furthermore assigned to the low gear stage.

In this embodiment, the high gear stage is, by way of example, forward gear stage 6, the middle gear stage is, by way of example, forward gear stage 4, and the low gear stage is, by way of example, forward gear stage 2.

In some embodiments, the second driver can furthermore be assigned to a reverse gear stage.

It is furthermore preferred in this embodiment if the individual shifting contour has a gear portion with a shifting contour switch which, in a first rotational position, forms the switch gear portion that is assigned to the middle gear stage and which, in a second rotational position, forms a gear portion for the high gear stage.

Provision is preferably made here for the second driver to be disengaged within the gear portion in the first rotational position in order to engage the middle gear stage, and for the first driver to be deflected in the region of this gear portion in the second rotational position in order to engage the high gear stage.

It is particularly advantageous here if a rotatability of the selector drum body is limited, such that the first driver reaches no further than the switch gear portion in a first direction of rotation.

This ensures that the shifting contour switch for the high gear stage is as it were not active since the first driver for the high gear stage is not rotated beyond this switch gear portion, thus ensuring that the first driver for the high gear stage can never "circumvent" the switch gear portion in the second direction of rotation.

According to another preferred embodiment, the individual shifting contour and the second driver are matched to one another in such a way that, when the selector drum body is rotated out of the switch gear portion in the second direction of rotation, the second driver is moved axially in a widened portion of the individual shifting contour in order to disengage the middle gear stage before the low gear stage is shifted or engaged.

This embodiment ensures that, when the first driver is rotated in the second direction of rotation in the widened portion of the individual shifting contour, it can remain in an axial position, thus ensuring that the high gear stage remains engaged while the driver for the middle gear stage is in the region of the switch gear portion. This makes it possible to perform a rapid multiple downshift without engaging the middle gear stage.

On the other hand, care should be taken to ensure that, in an initial position, in which the second driver for the middle gear stage is in the region of the switch gear portion, namely when the middle gear stage is engaged, a subsequent reversal of the direction of rotation cannot lead to the middle gear stage and the low gear stage being engaged simultaneously.

For this purpose, the selector drum preferably has a disengagement web in the region of the widened portion of the individual shifting contour, said web being designed to interact with the second driver. The disengagement web consequently acts selectively by moving the second driver axially in the case of the second direction of rotation in order to disengage the middle gear stage before the low gear stage is shifted. However, the disengagement web preferably does not act on the first driver, and therefore the first driver can remain shifted while the second driver is in the region of the switch gear portion, without however engaging the associated middle gear stage.

It is self-evident that the features mentioned above and those which will be explained below can be used not only in the respectively indicated combination but also in other combinations or in isolation without exceeding the scope of the present invention.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Illustrative embodiments of the invention are illustrated in the drawing and are explained in greater detail in the description below. In the drawing:

FIG. 12 shows a schematic illustration of a further embodiment of a selector drum having an individual shifting contour, in which two drivers engage, more specifically in a state in which a low gear stage 2 is engaged;

FIG. 13 shows the shifting contour of FIG. 12 in a state in which no gear stage is engaged;

FIG. 14 shows the shifting contour of FIG. 12, wherein a middle gear stage is engaged;

FIG. 15 shows the shifting contour of FIG. 12, wherein no gear stage is engaged;

FIG. 16 shows the shifting contour of FIG. 12, wherein a high gear stage is engaged;

FIG. 17 shows the shifting contour of FIG. 12 in a situation during a multiple downshift, wherein the high gear stage is engaged as before while a driver for a middle gear stage is in a region of a switch gear portion;

DESCRIPTION OF THE INVENTION

Figure 1:
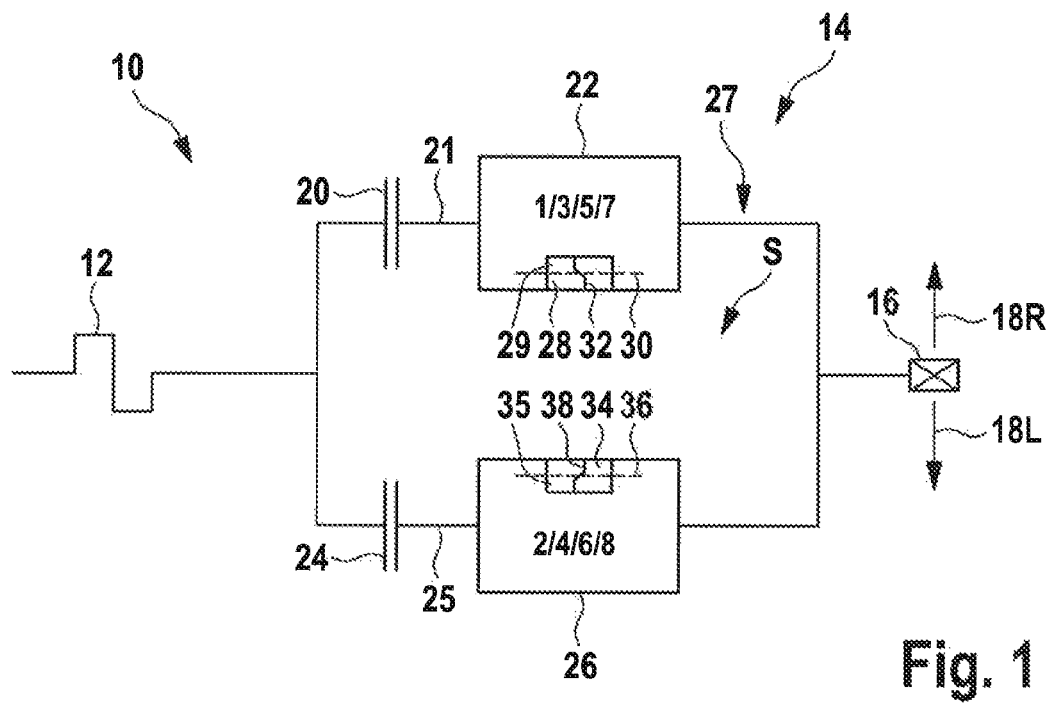
FIG. 1 shows a schematic illustration of a dual clutch transmission having two component transmissions and two selector drums.

A drive train for a motor vehicle is illustrated in schematic form and denoted overall by 10 in FIG. 1. The drive train 10 includes a drive motor 12, e.g. an internal combustion engine or a hybrid drive unit. In general, the drive motor 12 could also be an electric motor.

The drive train 10 furthermore has a dual clutch transmission 14, which is connected on the input side to the drive motor 12 and is connected on the output side to a differential 16, by means of which driving power can be distributed to driven wheels 18L, 18R.

The dual clutch transmission 14 has a first friction clutch 20, which is connected on the input side to the drive motor 12 and is connected on the output side to a first input shaft 21 of a first component transmission 22. The first component transmission 22 is assigned to the uneven forward gear stages and has forward gear stages 1, 3, 5, 7 and possibly 9 or further gear stages, for example.

Furthermore, the dual clutch transmission 14 has a second friction clutch 24, which is connected on the input side to the drive motor 12 and is connected on the output side to a second input shaft 25 of a second component transmission 26. In the present case, the second component transmission 26 is assigned to the even forward gear stages, that is to say, in particular, to forward gear stages 2, 4, 6 and possibly 8. The second component transmission 26 preferably also has a reverse gear stage.

On the output side, the first component transmission 22 and the second component transmission 26 are connected to an output shaft arrangement 27, which is connected to the differential 16.

The drive train 10 and the dual clutch transmission 14 have a control unit, which is not illustrated in the present case. By means of the control unit, it is possible to activate actuators in order to actuate the friction clutches 20, 24 and the component transmissions 22, 26.

For the purpose of actuating the component transmissions 22, 26, a shifting arrangement S is provided.

The shifting arrangement S is used to engage and disengage gear stages of the component transmissions 22, 26. The gear stages of the component transmissions 22, 26 are preferably engageable and disengageable by means of selector clutches, which are designed to connect a free gear of a gearset to an associated shaft. In particular, the selector clutches can be designed as synchronizing selector clutches of a construction known per se.

In the present case, the shifting arrangement S includes a first selector drum 28, which is assigned to the first component transmission 22. The first selector drum 28 has a first selector drum body 29, which can be rotated about a first axis of rotation 30. At least one first shifting contour 32 is formed on the first selector drum 28.

The shifting arrangement S furthermore includes a second selector drum 34, which is assigned to the second component transmission 26. The second selector drum 34 includes a second selector drum body 35, which is mounted so as to be rotatable about a second axis of rotation 36. At least one second shifting contour 38 is formed on the second selector drum 34.

The shifting contours 32, 38 are preferably each in engagement with at least one driver. Each driver is preferably assigned a selector clutch pack, which has one or two selector clutches, to enable a gear stage to be engaged and disengaged or to enable two gear stages to be engaged and disengaged as alternatives.

The first selector drum 28 is used to shift the gear stages of the first component transmission 22. The second selector drum 34 is used to shift the gear stages of the second component transmission 26.

In the present case, the first selector drum 28 and/or the second selector drum 34 is designed to be able to perform multiple downshifts, namely from a high gear stage to a low gear stage, without an intervening middle gear stage being engaged. Furthermore, the high gear stage can remain shifted for a relatively long time in order to keep a time of an interruption in the tractive effort relatively short.

Where multiple downshifts are mentioned in the present case, these refer to multiple downshifts by means of a single selector drum.

In the present case, a multiple downshift is understood to mean that there is at least one middle gear stage, preferably at least two middle gear stages and preferably at least three middle gear stages, between a starting gear stage (high gear stage) and a target gear stage (low gear stage). The latter is referred to as a fourfold downshift and relates, for example, to shifts from gear stage 7 to gear stage 3 or from gear stage 6 to gear stage 2, i.e. shifting processes in which, to prepare an acceleration in the manner of a kickdown for example, a low gear stage has to be engaged very quickly in order to be able to supply a very high tractive effort and acceleration for the motor vehicle within as short a time as possible.

Figure 2:
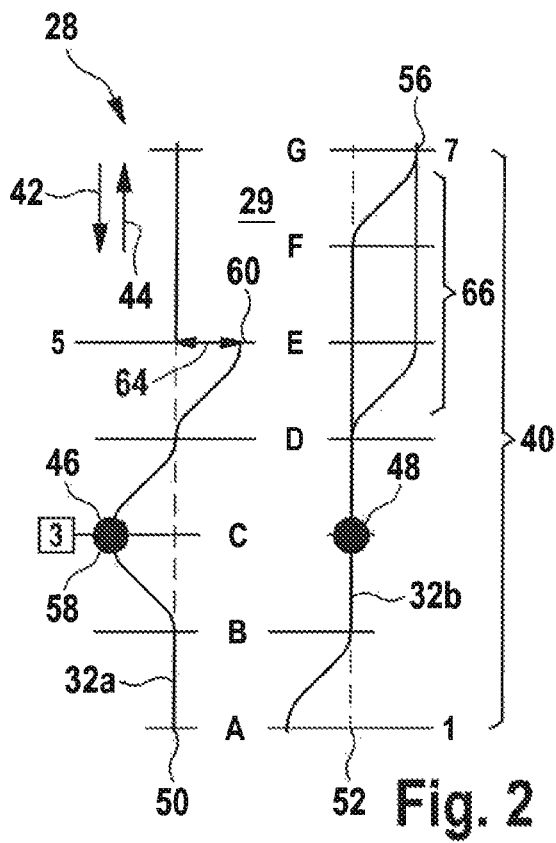
FIG. 2 shows a schematic developed view of a selector drum for a dual clutch transmission of the type shown in FIG. 1 in an initial state, in which a low gear stage is engaged.
Figure 3:
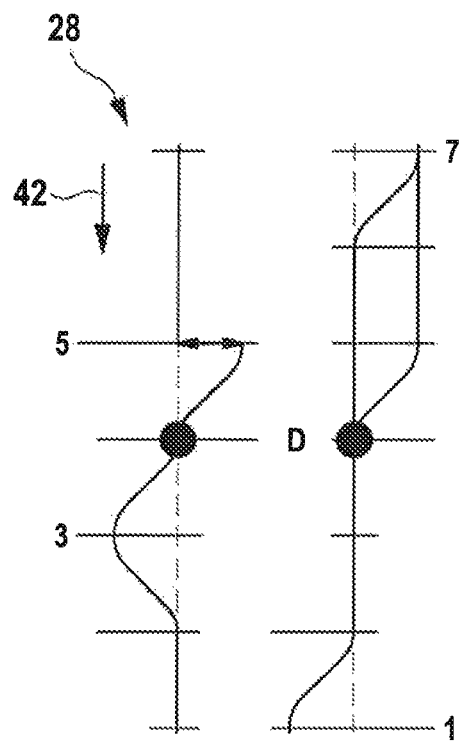
FIG. 3 shows the developed view of FIG. 2 in a state of transition between a shift state of the low and of the middle gear stage.
Figure 4:
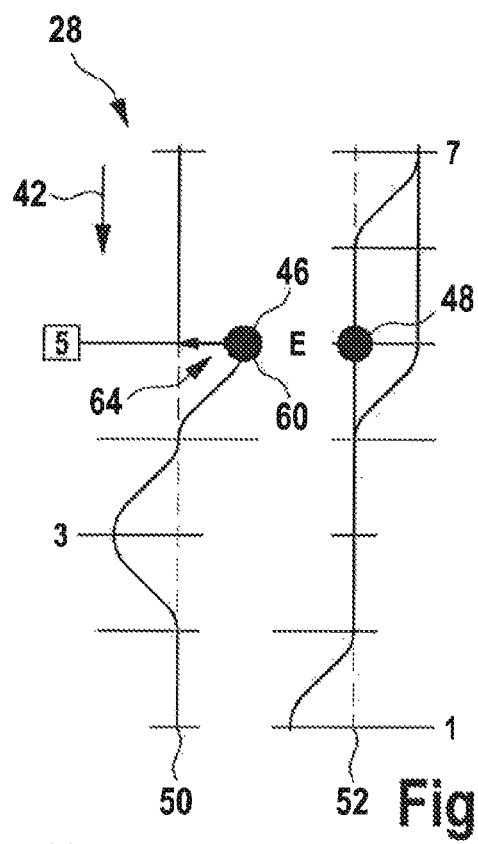
FIG. 4 shows the developed view of FIG. 2 in a state in which the middle gear stage is engaged.

FIG. 2 shows an embodiment of a first selector drum 28 which is suitable, for example, for actuating the forward gear stages of the first component transmission 22 of the dual clutch transmission 14 in FIG. 1.

The selector drum 28 in FIG. 2 has a first shifting contour 32a and a second shifting contour 32b, which is arranged offset axially relative to the latter. The shifting contours 32a, 32b extend over a circumferential segment 40 of the first selector drum 28. The circumferential segment 40 is preferably less than 360°. The circumferential segment 40 is preferably greater than 180°, in particular greater than 270°.

The two shifting contours 32a, 32b can extend over the same circumferential segment 40, as illustrated in FIG. 2. However, they can also be offset in the circumferential direction relative to one another. This depends on the position of drivers, as will be described below.

The illustration in FIG. 2 is a schematic illustration of a development of the first selector drum 28 and it is shown that the selector drum 28 can be rotated in a first direction of rotation 42 or in an opposite, second direction of rotation 44.

The first selector drum 28 (and also the second selector drum 34) is (are) preferably activatable by means of suitable electric motors, which can preferably be set in rotation independently of one another.

Engaging in the first shifting contour 32a is a first driver 46, which in the present case is assigned to gear stages 3 and 5, i.e. to a middle gear stage 5 and a low gear stage 3. Engaging in the second shifting contour 32b is a second driver 48, which is assigned to a high gear stage 7 and optionally to a driveaway gear stage 1, as illustrated in FIG. 2.

The shifting contours 32a and 32b have a neutral line 50 and 52 respectively. To set gear stage 1, a first gear portion 54 is provided on the second shifting contour 32b, said portion being offset to the left relative to the neutral line 52. To set forward gear stage 7, a second gear portion 56 is provided on the second shifting contour 32b, said portion being offset to the right relative to the neutral line 52.

Furthermore, the first shifting contour 32a has a third gear portion 58, which is assigned to the low gear stage. Furthermore, the first shifting contour 32a has a fourth gear portion 60, which is assigned to the middle gear stage 5.

For better tracking of the respective circumferential position, FIG. 2 illustrates that the circumferential segment 40 for the shifting contours 32a, 32b is subdivided into a plurality of positions A to G.

The first gear portion 54 is at position A. The third gear portion 58 is at position C. The fourth gear portion 60 is at position E. The second gear portion 56 is at position G. In each of the intermediate positions B, D, F, there is in general no gear stage (apart from the exception described below).

The selector drum 28 has a shifting contour switch 64 in the region of the fourth gear portion 60 for the middle gear stage 5. The shifting contour switch 64 is designed in such a way that a driver 46 guided in the first shifting contour 32a is offset axially in the first direction of rotation of the selector drum 28, i.e. coming from position D, in order to engage the forward gear stage 5.

On the other hand, the shifting contour switch 64 is designed in such a way that, when the selector drum 28 is rotated in the second direction of rotation 44, the driver 46 moves into the fourth gear portion 60, starting from position F, and, during this process, is not deflected axially, thus ensuring that the middle gear stage 5 is not engaged in the second direction of rotation 44.

On the other hand, the second shifting contour 32b has a widened portion 66 between position G and position D, said portion being designed in such a way that, in the second direction of rotation 44, the high forward gear stage 7 can remain engaged while the driver 46 for the middle gear stage is in the region of the fourth gear portion 60, which in the present case is also referred to as a switch gear portion.

In other words, forward gear stage 7 can be engaged in positions G, F and E when the selector drum is rotated in the second direction of rotation 44. On the other hand, the high gear stage 7 is not engaged in positions E and F when the selector drum 28 is moved in the first direction of rotation, i.e. the second driver 48 moves out of position D in the direction of position G.

The subsequent FIGS. 3 to 6 are first of all used to describe how the selector drum 28 is moved in the first direction of rotation 42, starting from the rotational position shown in FIG. 2, with the result that the low gear stage 3 is first of all disengaged, the middle gear stage 5 is subsequently engaged, then the middle gear stage 5 is disengaged again, and subsequently the high gear stage 7 is engaged.

This is shown in different phases, starting from the position shown in FIG. 2, in which the drivers 46, 48 are in position C, in which the first driver 46 is deflected by the third gear portion 58, i.e. the low forward gear stage 3 is engaged. The second driver 48 is on the neutral line 52.

Rotation of the selector drum 28 in the first direction of rotation 42 leads to the drivers being moved into rotational position D. This leads to the disengagement of the low gear stage 3. In the illustration in FIG. 3, no gear stage is engaged.

Upon further rotation in the first direction of rotation 42, the first driver 46 is deflected at E into the fourth gear portion 60 in order to engage the middle forward gear stage 5. The second driver 48 is within the widened portion 66, on the neutral line 52 as before. In the illustration in FIG. 4, only forward gear stage 5 is thus engaged.

Figure 5:
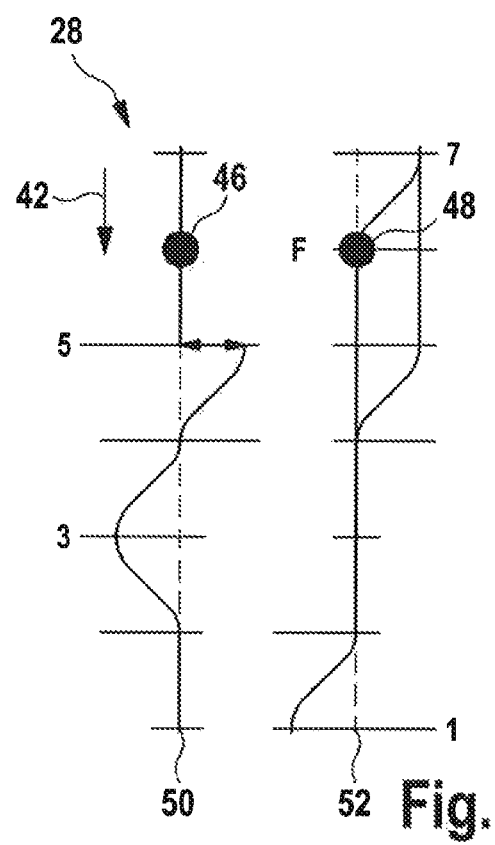
FIG. 5 shows the developed view of FIG. 2 in a state in which the middle gear stage is disengaged and a high gear stage has not yet been engaged.

Further rotation in the first direction of rotation to F leads to the forward gear stage 5 being disengaged. FIG. 5 shows that none of the forward gear stages of the first component transmission is engaged. The two drivers 46, 48 are both on their neutral lines 50, 52.

Figure 6:
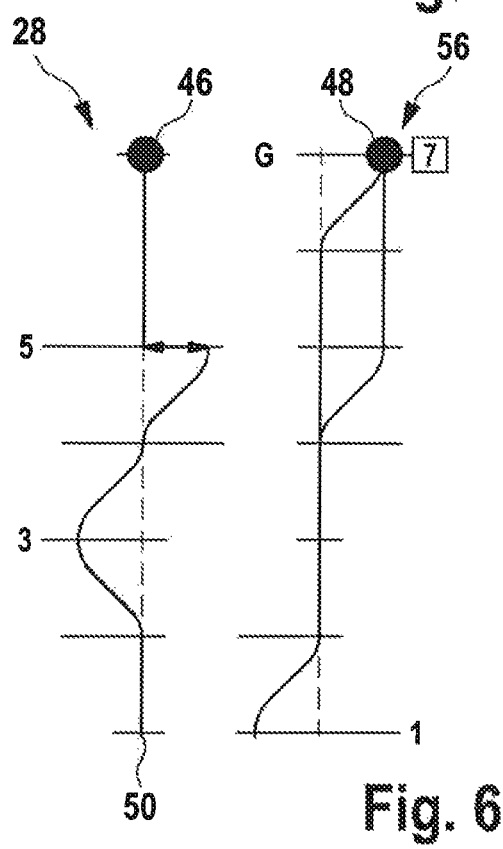
FIG. 6 shows the developed view of FIG. 2, wherein the high gear stage is engaged.

FIG. 6 shows that the selector drum 28 has been rotated further in the first direction of rotation 42 until, in region G of the second gear portion 56, the high forward gear stage 7 is engaged. The first driver 46 is on the neutral line 50.

If a multiple downshift into forward gear stage 3 is to be carried out, starting from the state shown in FIG. 6, in which the high forward gear stage 7 is engaged, the selector drum 28 is rotated in the second direction of rotation 44, as described in the following FIGS. 7 to 9.

Starting from the position shown in FIG. 6, the drivers move into position F (illustrated in dashed lines in FIG. 7), wherein driver 48 remains in the deflected position, as before, by virtue of the widened portion 66, said position corresponding to forward gear stage 7, with the result that the high gear stage 7 remains engaged despite rotation in the second direction of rotation 44.

Figure 7:
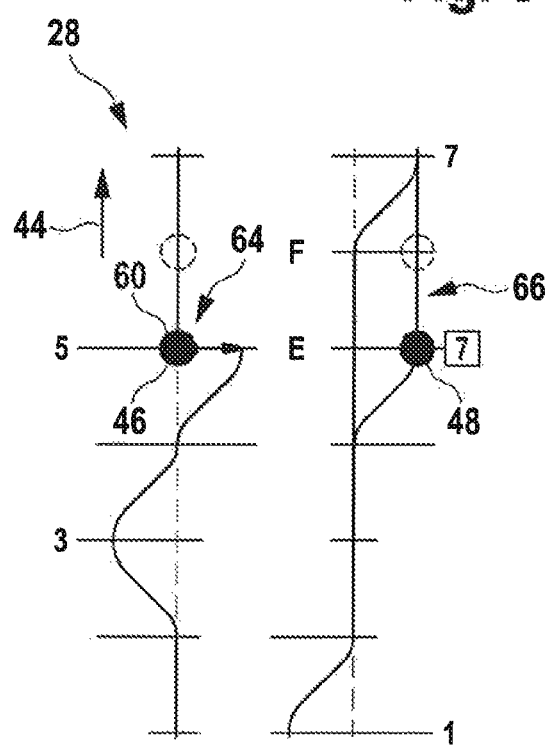
FIG. 7 shows the developed view of FIG. 2 in a state in which the high gear stage remains engaged owing to a widened portion of a shifting contour while a driver of the middle gear stage is in a switch gear portion in which the middle gear stage is not engaged.

FIG. 7 also shows that the first driver 46 is in the region of the fourth gear portion (switch gear portion) 60. Here, the shifting contour switch 64 of the fourth gear portion 60 comes into effect in such a way that the first driver 46 is not deflected, i.e. forward gear stage 5 is not engaged. The widened portion 66 of the second shifting contour 32b overlaps in the axial direction with the fourth gear portion 60, such that forward gear stage 7 remains engaged in position E too, as illustrated in FIG. 7.

Figure 8:
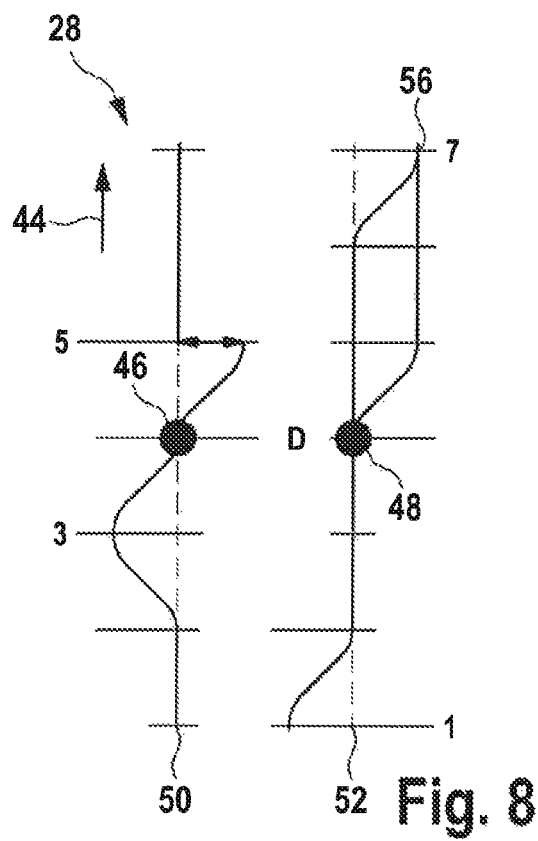
FIG. 8 shows the developed view of FIG. 2 starting from the state in FIG. 7, in which the middle gear stage and the high gear stage are disengaged.
Figure 9:
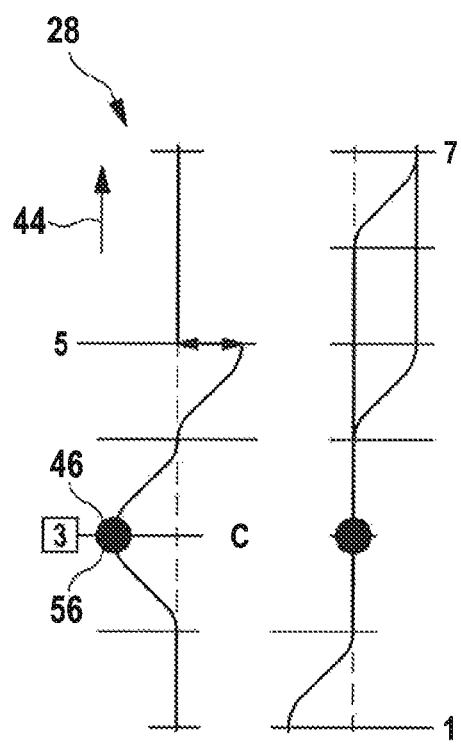
FIG. 9 shows the developed view of FIG. 2 in an illustration based on FIG. 8, in which the low gear stage is engaged and the high gear stage is disengaged, wherein the illustration in FIG. 9 corresponds to that in FIG. 2.

Further rotation in the second direction of rotation 44 leads to the drivers moving into position D, as shown in FIG. 8, wherein gear stage 5 remains disengaged and wherein forward gear stage 7 is disengaged. The two drivers 46, 48 are situated on their respective neutral lines.

Further rotation out of this position in the second direction of rotation 44 leads to the first driver 46 being deflected in the region of the second gear portion 56 in order to engage the forward gear stage 3. This is shown in FIG. 9, wherein the illustration in FIG. 9 corresponds to the situation shown in FIG. 2.

Figure 10:
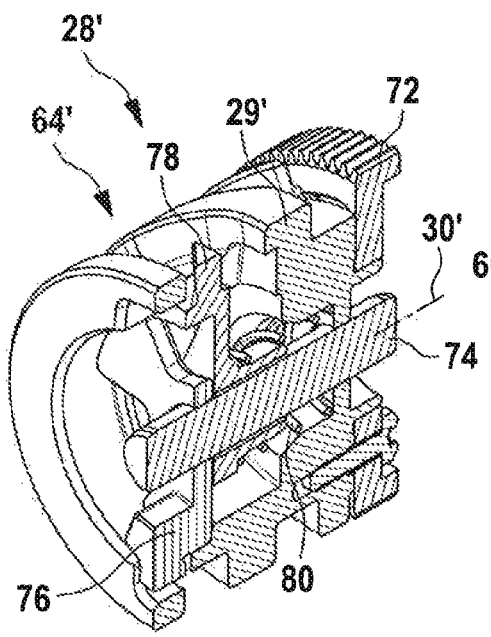
FIG. 10 shows a schematic longitudinally sectioned view through an embodiment of a selector drum which corresponds in respect of construction and operation to the selector drum of FIGS. 2 to 9.
Figure 11:
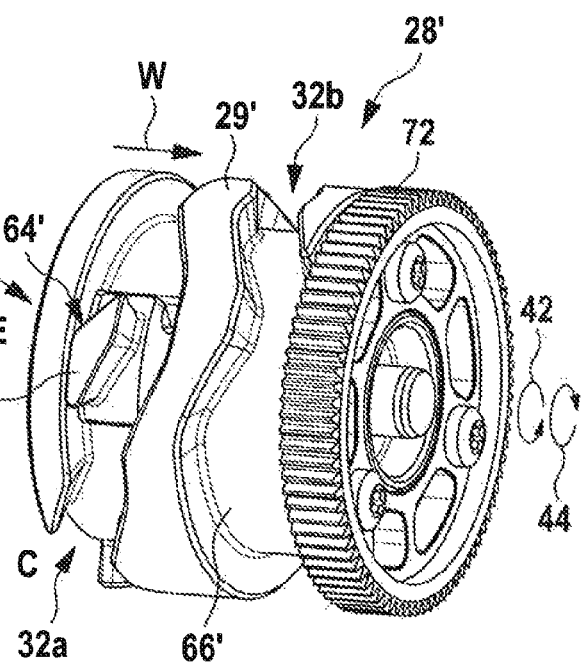
FIG. 11 shows a perspective illustration of the selector drum in FIG. 10.

FIGS. 10 and 11 show a selector drum 28' which, in general, can correspond to the selector drum 28 shown in FIGS. 2 to 9 in terms of construction and operation. Identical elements are therefore indicated by identical reference signs.

FIGS. 10 and 11 show that the selector drum has a selector drum body 29', on one axial end of which a drive wheel 72 is fixed, e.g. by a plurality of screws arranged in a manner distributed over the circumference. The drive wheel 72 can have spur gear toothing, as illustrated, which is in engagement with spur gear toothing of a drive pinion connected to a drive shaft of an electric selector drum motor, thus enabling the selector drum 28' to be driven in both directions of rotation.

The selector drum 28' furthermore has a drum shaft 74, which is arranged coaxially with the first axis of rotation 30'. The drum shaft 74 is connected rigidly to a body of revolution 76. In particular, the connection is rigid in the direction of rotation, e.g. by virtue of shrink fitting or the like. The body of revolution 76 is coupled to the selector drum body 29' in the circumferential direction, the body of revolution 76 preferably also being secured on the drum shaft 74 in the axial direction. The body of revolution 76 is preferably made of plastic.

A switch body 78 is mounted in an axially displaceable manner on the drum shaft 74 and is preloaded into an initial position, shown in the figures, against the body of revolution by means of a spring 80. The switch body 78 is part of a shifting contour switch 64', which is formed in the region of the first shifting contour 32a, in the present case, for example, in the region of the circumferential position E corresponding to a fourth gear portion 60 for the middle forward gear stage 5.

As can be seen especially in FIG. 11, the switch body 78 is shaped in such a way that a driver engaging in the first shifting contour 32a is deflected in the region of the fourth gear portion 60 in the first direction of rotation of the selector drum body 29'. In the opposite, second direction of rotation 44, the driver engages behind a pocket of the switch body 78 and deflects the switch body 78 in a direction W against the preloading of the spring 80. As a result, driver 46 can traverse the fourth gear portion 60 in the second direction of rotation 44 of the selector drum body 29 without driver 46 being deflected. Consequently, the associated middle gear stage is not engaged in the second direction of rotation 44.

A widened section 66' of the second shifting contour 32b is furthermore illustrated in FIG. 11.

Although, in the present case, the selector drum 28 or 28' hitherto described is assigned to the uneven forward gear stages, it is self-evident that the same selector drum can also be assigned to even forward gear stages, such that the first gear portion corresponds to a reverse gear stage for example, the second gear portion 56 corresponds to a forward gear stage 6 for example, the third gear portion 58 corresponds to a low forward gear stage 2 for example, and the fourth gear portion 60 is assigned to a middle forward gear stage 4 for example.

In the following figures, an alternative embodiment of a selector drum is illustrated, which has an individual shifting contour instead of two axially offset shifting contours 32a, 32b. This is explained by means of an example of the second selector drum 34, which is assigned to the component transmission comprising the even forward gear stages. The embodiments of second selector drums 34" which are explained below can likewise be integrated into the dual clutch transmission 14 in FIG. 1.

A selector drum 34" of this kind is illustrated schematically in a developed view in FIG. 12. The selector drum 34" has an individual shifting contour 38" with a neutral line 50. Furthermore, the individual shifting contour 38" includes a first gear portion 82, which is offset to the right relative to the neutral line 50, and a second gear portion 84, which is offset in the opposite axial direction relative to the neutral line 50. The individual shifting contour 38" extends over a circumferential segment and is subdivided into individual positions A", B", C", . . . , H", I".

The first gear portion 82 is at position C". The second gear portion 84 is at position G". Engaging in the individual shifting contour 38" are a first driver 46", which is assigned to the forward gear stages 2, 6, and a second driver 48", which is assigned to forward gear stage 4 and to the reverse gear stage. The circumferential distance between the drivers 46", 48" corresponds to half the distance between the two gear portions 82, 84. When the first driver 46" is in the second gear portion 84, the second driver 48" is in position I". When the second driver 48" is in the region of the first gear portion 82, the first driver 46" is in position A.

The first gear portion 82 is assigned to the reverse gear stage and to the low forward gear stage 2. The second gear portion 84 is assigned to the middle gear stage 4 and to the high gear stage 6. The second gear portion 84 is designed as a switch gear portion with a shifting contour switch 64". Furthermore, a widened portion 66", the function of which corresponds to the widened portion 66 of the embodiment in FIGS. 2 to 11, extends in the direction of the first gear portion 82, starting from the second gear portion 84.

FIG. 12 shows a situation wherein the first driver 46" is in the region of the first gear portion 82, with the result that the low forward gear stage 2 is engaged. The second driver 48" is in the region of position E", more specifically on the neutral line 50.

In the following FIGS. 13 to 16, a description is first of all given as to how, starting from the situation shown in FIG. 12, the high forward gear stage 6 is engaged, wherein the middle gear stage 4 is engaged in the meantime.

For this purpose, the second selector drum 34" is rotated in the first direction of rotation 42, such that the first driver 46" moves into position D" and the second driver 48" into position F", with the result that both drivers are arranged on the neutral line and no gear stage is engaged. Starting from this situation shown in FIG. 13, the second selector drum 34" is rotated further in the first direction of rotation 42, such that the second driver 48" moves into rotational position G", i.e. is deflected in the region of the second gear portion 84 in such a way that the middle forward gear stage 4 is engaged. In this case, the first driver 46" is in position E", i.e. on the neutral line 50.

Further rotation out of the position shown in FIG. 14 leads to the illustration shown in FIG. 15, in which the first driver 46" is arranged in rotational position F" and in which the second driver 48" is arranged in rotational position H", i.e. no gear stage is engaged. In this case, both drivers 46", 48" are on the neutral line 50.

FIG. 16 shows the situation in which the first driver 46" is in rotational position G", i.e. in the region of the second gear portion 84. In this case, the high forward gear stage 6 is engaged. The second driver 48" is on the neutral line 50 of the individual shifting contour 38", more specifically in rotational position I".

Starting from this position, in which the high forward gear stage 6 is engaged, a multiple downshift to the low gear stage 2 is then to be carried out. This is explained by means of FIGS. 17 to 19.

For this purpose, the selector drum 34" is rotated in the second direction of rotation 44, with the result that the second driver 48" moves into rotational position G. Owing to the function of the shifting contour switch 64", the second driver 48" is not deflected in this region of the second gear portion 84, with the result that the middle forward gear stage 4, to which the second driver 48" is assigned, is not engaged.

On the other hand, the first driver 46" remains in the deflected position by virtue of the widened portion 66", with the result that the high forward gear stage 6 remains engaged. This is shown in FIG. 17, wherein the first driver 46" is in rotational position E".

Further rotation of the second selector drum 34" in the second direction of rotation 44 leads to the first driver 46" moving into rotational position D". The second driver 48" is then in rotational position F". For both rotational positions, the drivers are each on the neutral line 50, and therefore no gear stage is shifted.

Figure 18:
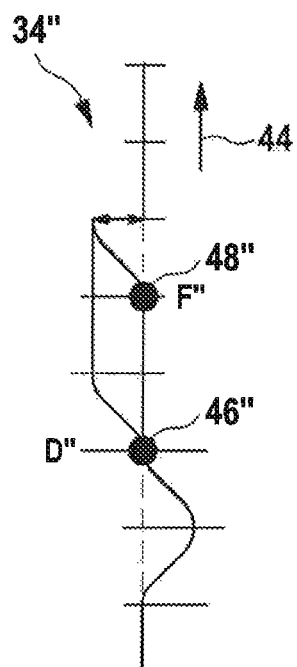
FIG. 18 shows the shifting contour of FIG. 12, wherein no gear stage is engaged during continued rotation in the second direction of rotation.
Figure 19:
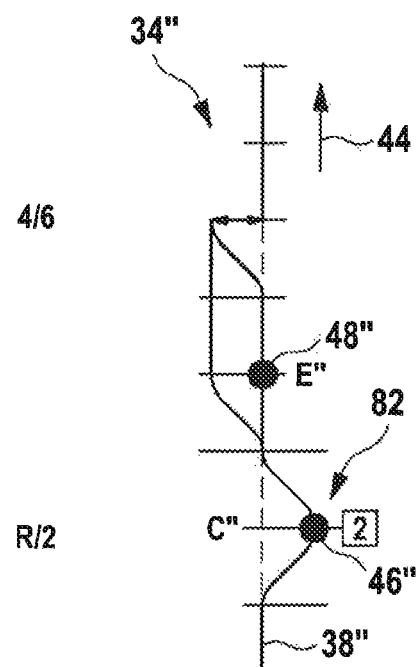
FIG. 19 shows the shifting contour of FIG. 12, wherein the low gear stage is engaged, i.e. a state is shown which corresponds to that in FIG. 12.

Further rotation in the second direction of rotation 44 leads out of the situation shown in FIG. 18 to the situation shown in FIG. 19, in which the first driver 46" is in rotational position C", corresponding to the first gear portion 82, such that the low forward gear stage 2 is engaged. The second driver 48 is in rotational position E", with the result that no corresponding gear stage is since the second driver 48" is on the neutral line 50.

In the case of the second selector drum 34" too, a rapid multiple downshift from a high gear stage 6 to a low gear stage 2 can consequently be carried out without engaging the intervening middle gear stage 4. Furthermore, the high gear stage can remain shifted over a relatively long period of time, and therefore the period of time for which the selector drum 34" requires an interruption in the tractive effort to shift from the high forward gear stage 6 to the low gear stage 2 is relatively short.

FIG. 14 illustrates schematically that the widened portion 66" is preferably assigned a disengagement web 88.

The disengagement web 88 acts selectively on the drivers 46", 48", more specifically in the following way. The disengagement web 88 is preferably arranged in the region between rotational positions G" and D".

This disengagement web 88 or some other disengagement contour has no effect on the first driver 46". This has the effect that, when the second direction of rotation 44 is initiated from the position shown in FIG. 16, the first driver 46" remains in its deflected position when it crosses over the disengagement web 88.

However, the disengagement web 88 interacts with the second driver 48". Starting from the situation shown in FIG. 14, in which the second driver 48" is in the region of the second gear portion 84, a reversal of the direction of rotation could also take place instead of further rotation in the first direction of rotation 42 (which would lead to the situation in FIG. 15). In this case, starting from the situation shown in FIG. 14, the second driver 48" is guided back out of the deflected position into the undeflected position, i.e. to the neutral line 50, within the widened portion 66" by means of the disengagement web 88, with the result that the forward gear stage 4, which is engaged in FIG. 14, is disengaged before the low forward gear stage 2 is engaged by means of the first driver 46".

Figure 20:
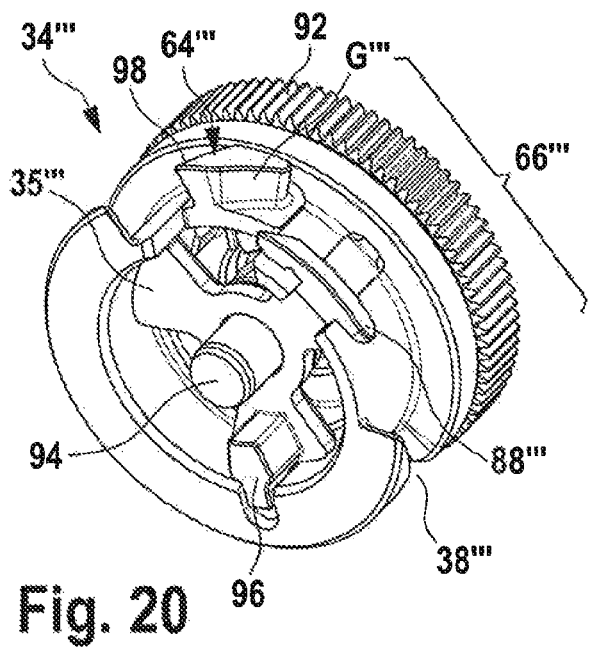
FIG. 20 shows a schematic, partially cutaway perspective view of an embodiment of a selector drum which corresponds in respect of construction and operation to the selector drum of FIGS. 12 to 19.
Figure 21:
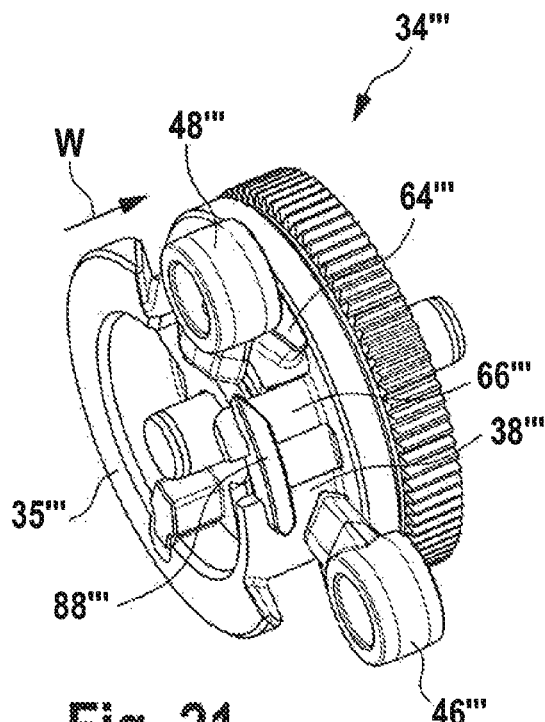
FIG. 21 shows another partially cutaway schematic perspective view of the selector drum in FIG. 20.
Figure 22:
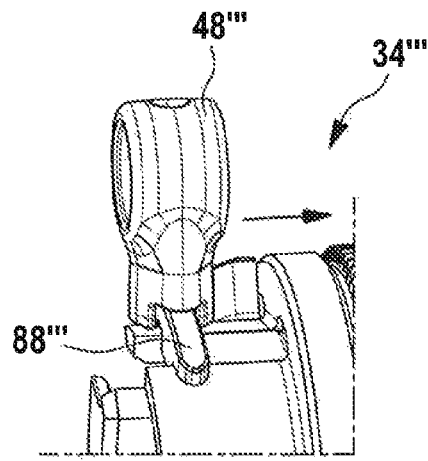
FIG. 22 shows a perspective detail view of the selector drum in FIGS. 20 and 21.

FIGS. 20 to 22 show an embodiment of a second selector drum 34''' which, in general, corresponds to the selector drum 34" in FIGS. 12 to 19 in terms of construction and operation. Identical elements are therefore indicated by identical reference signs. It is essentially the differences which are explained below.

The second selector drum 34''' has a second selector drum body 35''', on one axial end of which a drive wheel 92 is fixed, similarly to the embodiment in FIGS. 10 and 11.

Furthermore, the second selector drum 34''' includes a drum shaft 94, on which, as also in the embodiment in FIGS. 10 and 11, a switch body 98 can be moved axially, more specifically, under a preload by means of a spring 100, into an initial position which enables a driver which is approaching the second gear portion 84 in the first direction of rotation 42 to be deflected by means of the switch body 78 in order to engage the respective gear stage.

On the other hand, the switch body 98 is designed in such a way that, in the opposite direction of rotation, a driver approaching the second gear portion 84 deflects the switch body 98, more specifically in a direction W, similarly to the embodiment in FIGS. 10 and 11.

The figures illustrate that two drivers 46''', 48''' engage in the individual shifting contour 38'''.

It is furthermore shown that a disengagement web 88''' is arranged in the region of a widened portion 66''', said web acting selectively only on the first driver 46''' in order, if appropriate, to force it back out of the shifted position for the engagement of the middle forward gear stage 4 in the direction of the neutral line 50 before the low forward gear stage 2 is engaged by means of the first driver 46'''.

The second selector drum 34" has been described as a selector drum which is assigned to forward gear stages 2, 4, 6 and a reverse gear stage. In the same way, the second selector drum 34" can also be assigned to uneven gear stages, wherein the first driver 46" is assigned to the forward gear stages 7, 3, for example, and wherein the second driver 48" is assigned to forward gear stage 5 and optionally to a driveaway gear stage 1.

The invention claimed is:

1. A selector drum for a dual clutch transmission, the selector drum having a selector drum body, which can be mounted in the transmission for rotation about an axis of rotation, wherein at least one shifting contour is formed on the selector drum body, said shifting contour extending over a peripheral portion of the selector drum body, wherein the selector drum is designed for shifting at least one high gear stage, one middle gear stage and one low gear stage, wherein the at least one shifting contour has a shifting contour switch in a region of a switch gear portion, wherein the switch gear portion is assigned to the middle gear stage, wherein the switch gear portion is designed, by means of the shifting contour switch, in such a way that the middle gear stage is shifted in a first direction of rotation of the selector drum body and is not shifted in a second direction of rotation, wherein the at least one shifting contour is also designed in such a way that, in the second direction of rotation of the selector drum body, the high gear stage can remain shifted if a driver assigned to the middle gear stage is in a region of the switch gear portion, such that, proceeding from the high gear stage, the low gear stage can be shifted without shifting the middle gear stage;

wherein the at least one shifting contour has an individual shifting contour, in which a first driver and a second driver engage, wherein the first driver is assigned to the high gear stage and wherein the second driver is assigned to the middle gear stage.

2. The selector drum as claimed in claim 1, wherein the shifting contour switch of the switch gear portion is a passive switch.

3. The selector drum as claimed in claim 1, wherein the at least one shifting contour has an axially widened portion.

4. The selector drum as claimed in claim 1, wherein the selector drum has a first shifting contour, in which a first driver for the middle gear stage engages, and a second shifting contour, in which a second driver for the high gear stage engages.

5. The selector drum as claimed in claim 4, wherein the first driver, which engages in the first shifting contour, is assigned to a selector clutch pack which includes a selector clutch for the middle gear stage and a selector clutch for the low gear stage.

6. The selector drum as claimed in claim 1, wherein the switch gear portion and an output gear portion assigned to the high gear stage overlap in the circumferential direction.

7. The selector drum as claimed in claim 6, wherein a target gear portion for the low gear stage is adjacent in the circumferential direction to the switch gear portion.

8. The selector drum as claimed in claim 1, wherein the first driver is furthermore assigned to the low gear stage.

9. The selector drum as claimed in claim 1, wherein the individual shifting contour has a gear portion with a shifting contour switch which, in a first rotational position, forms the switch gear portion for the middle gear stage and which, in a second rotational position, forms a gear portion for the high gear stage.

10. The selector drum as claimed in claim 9, wherein a rotatability of the selector drum body is limited, such that the first driver reaches no further than the switch gear portion in a first direction of rotation.

11. The selector drum as claimed in claim 1, wherein the individual shifting contour and the second driver are matched to one an-other in such a way that, when the selector drum body is rotated out of the switch gear portion in the second direction of rotation, the second driver is moved axially in a widened portion of the individual shifting contour in order to disengage the middle gear stage before the low gear stage is shifted.

12. A manual transmission for a motor vehicle, having an input shaft arrangement, an output shaft arrangement and a plurality of gearsets, which can be shifted by means of a shift arrangement, which has a selector drum as claimed in claim 1.

13. The manual transmission as claimed in claim 12, wherein the dual clutch transmission has a first component transmission and a second component transmission, and wherein the selector drum is assigned to one of the two component transmissions.

14. A selector drum for a dual clutch transmission, the selector drum comprising:

a selector drum body configured to be mounted in the dual clutch transmission for rotation about an axis of rotation;

at least one shifting contour formed on the selector drum body, the shifting contour extending over a peripheral portion of the selector drum body;

the selector drum configured to provide shifting between at least one high gear stage, one middle gear stage and one low gear stage;

the at least one shifting contour having a shifting contour switch in a region of a switch gear portion;

the switch gear portion assigned to the middle gear stage;

the switch gear portion configured such that, by means of the shifting contour switch, the middle gear stage is shifted in a first direction of rotation of the selector drum body and is not shifted in a second direction of rotation;

wherein the at least one shifting contour is also configured such that, in the second direction of rotation of the selector drum body, the high gear stage can remain shifted if a driver assigned to the middle gear stage is in a region of the switch gear portion, such that, proceeding from the high gear stage, the low gear stage can be shifted without shifting the middle gear stage;

wherein the at least one shifting contour has an individual shifting contour, in which a first driver and a second driver engage, wherein the first driver is assigned to the high gear stage and wherein the second driver is assigned to the middle gear stage.

15. The selector drum as claimed in claim 14, wherein the shifting contour switch of the switch gear portion is a passive switch.

16. The selector drum as claimed in claim 14, wherein the at least one shifting contour has an axially widened portion.

17. The selector drum as claimed in claim 14, wherein the selector drum has a first shifting contour, in which a first driver for the middle gear stage engages, and a second shifting contour in which a second driver for the high gear stage engages.

18. The selector drum as claimed in claim 17, wherein the first driver, which engages in the first shifting contour, is assigned to a selector clutch pack which includes a selector clutch for the middle gear stage and a selector clutch for the low gear stage.

19. The selector drum as claimed in claim 14, wherein the switch gear portion and an output gear portion assigned to the high gear stage overlap in the circumferential direction.

20. The selector drum as claimed in claim 19, wherein a target gear portion for the low gear stage is adjacent in the circumferential direction to the switch gear portion.

\* \* \* \* \*